United States Patent [19]

Arimoto

[11] Patent Number: 5,485,535
[45] Date of Patent: Jan. 16, 1996

[54] DATA PROCESSING SYSTEM COMPRISING A PLURALITY OF DATA PROCESSING APPARATUS CONDUCTING DATA COMMUNICATIONS THROUGH A BUS LINE

[75] Inventor: Shinobu Arimoto, Tokyo, Japan

[73] Assignee: Canon Kabushiki Kaisha, Tokyo, Japan

[21] Appl. No.: 372,841

[22] Filed: Jan. 13, 1995

Related U.S. Application Data

[63] Continuation of Ser. No. 164,823, Dec. 9, 1993, abandoned, which is a continuation of Ser. No. 933,007, Aug. 21, 1992, abandoned, which is a continuation of Ser. No. 711,103, Jun. 3, 1991, abandoned, which is a continuation of Ser. No. 82,977, Aug. 4, 1987, abandoned, which is a continuation of Ser. No. 14,140, Feb. 12, 1987, abandoned, which is a continuation of Ser. No. 645,161, Aug. 28, 1984, abandoned.

[30] Foreign Application Priority Data

| Aug. 30, 1983 | [JP] | Japan | 58-158451 |
| Aug. 30, 1983 | [JP] | Japan | 58-158453 |
| Aug. 30, 1983 | [JP] | Japan | 58-158455 |
| Aug. 30, 1983 | [JP] | Japan | 58-158457 |

[51] Int. Cl.[6] ............................ G06K 9/00
[52] U.S. Cl. ............................ 382/305
[58] Field of Search ............ 382/305; 358/434, 358/436, 437, 442, 409

[56] References Cited

U.S. PATENT DOCUMENTS

| 3,751,582 | 8/1973 | Wernikoff | 178/6 |
| 4,363,104 | 12/1982 | Nussmeier | 382/41 |
| 4,426,731 | 1/1984 | Edlund et al. | 382/56 |
| 4,441,208 | 4/1984 | Iida | 382/56 |
| 4,442,543 | 4/1984 | Sternberg et al. | 382/41 |
| 4,445,137 | 4/1984 | Panofsky | 382/41 |
| 4,445,185 | 4/1984 | Davis, Jr. et al. | 382/56 |
| 4,453,267 | 6/1984 | Paganini et al. | 382/56 |
| 4,494,150 | 1/1985 | Brickman et al. | 358/261.1 |
| 4,525,858 | 6/1985 | Cline et al. | 382/41 |
| 4,571,633 | 2/1986 | Kondo | 382/56 |
| 4,573,083 | 2/1986 | Shimizu | 358/434 |
| 4,602,333 | 7/1986 | Komori | 358/261.1 |
| 4,672,679 | 6/1987 | Freeman | 382/56 |

FOREIGN PATENT DOCUMENTS

| 0050234 | 4/1982 | European Pat. Off. ......... G06K 9/60 |
| 104887 | 4/1984 | European Pat. Off. . |
| 2465273 | 3/1981 | France ............................. G06F 15/16 |
| 1595446 | 8/1981 | United Kingdom . |
| 82/02965 | 9/1982 | WIPO . |

OTHER PUBLICATIONS

C. D. Stamopoulos, "Parallel Image Processing", *IEEE Trans. on Computers*, vol. C–24, No. 4, pp. 424–433, Apr. 1975.

Inagaki et al., "MACSYM: An event–driven parallel processor for document pattern understanding", IEEE Proceedings of The International Joint Conference on Pattern Recognition, Munich, Oct. 19–22, 1982, part 1, pp. 258–261.

NTG–Fachberichte, "Bilddarstellende Systeme und Technologien für neue Kommunikationsformen", by K. H. Vöge, Mar. 1979, vol. 67, pp. 210 to 218.

*Primary Examiner*—Jose L. Couso
*Attorney, Agent, or Firm*—Fitzpatrick, Cella, Harper & Scinto

[57] ABSTRACT

An image processing system has a computer bus line to which a communication controller or the like is connected, an image reader, an RP adapter including a data compressor unit, a serial-to-parallel converter, a data restoration unit and a parallel-to-serial converter, and a CPU and a controller for selecting the data from the image reader or the communication controller. While no image data is transferred on the bus line, data transfer from the communication controller or the like via the bus can be performed.

12 Claims, 9 Drawing Sheets

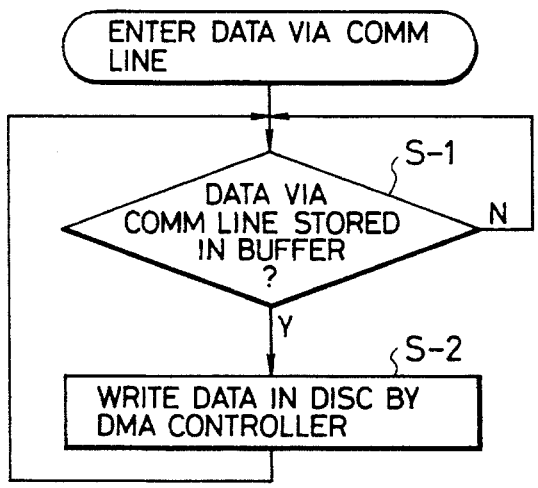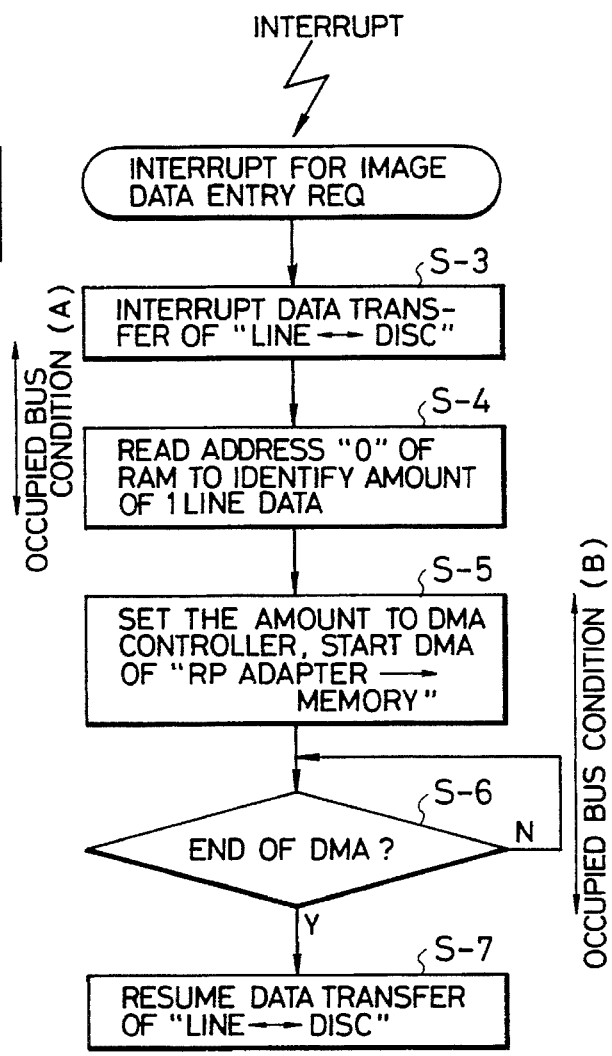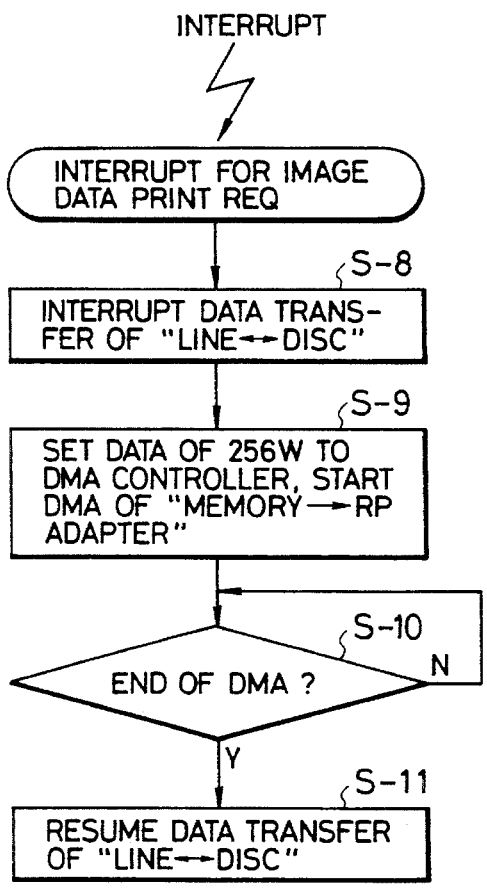

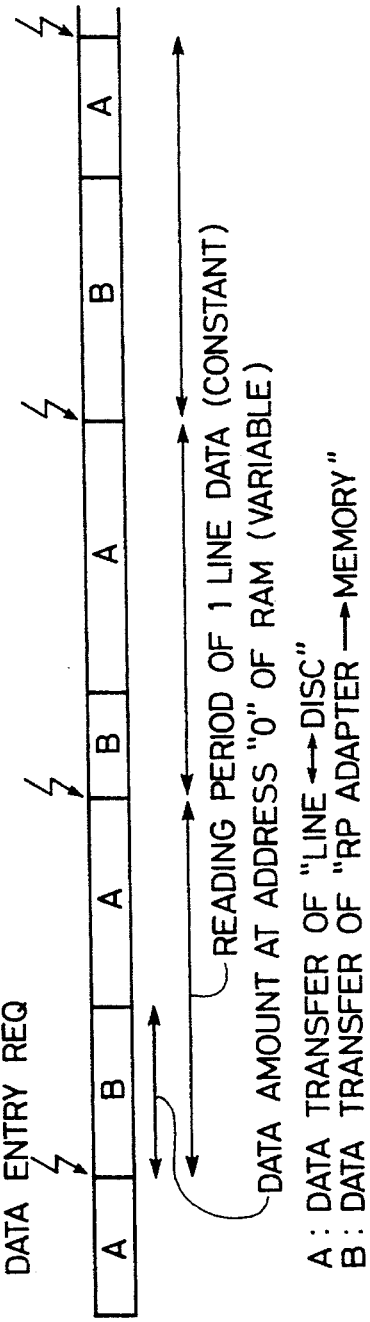
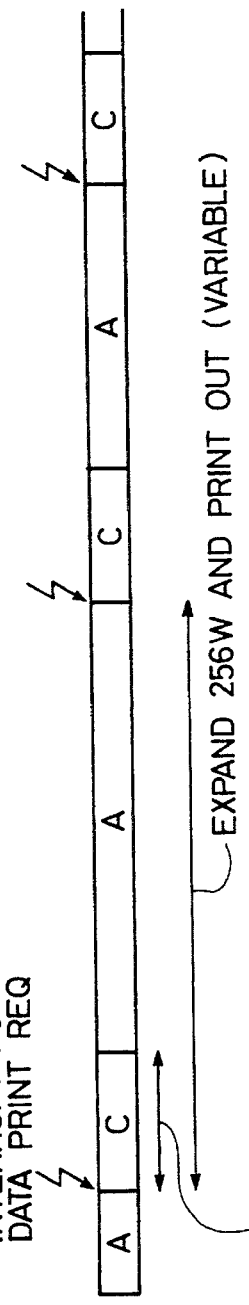

DATA PROCESSING SYSTEM COMPRISING A PLURALITY OF DATA PROCESSING APPARATUS CONDUCTING DATA COMMUNICATIONS THROUGH A BUS LINE

This application is a continuation of application Ser. No. 08/164,823 filed Dec. 9, 1993, now abandoned, which is a continuation of application Ser. No. 07/933,007 filed Aug. 21, 1992, now abandoned, which is a continuation of application Ser. No. 07/711,103 filed Jun. 3, 1991, now abandoned, which is a continuation of application Ser. No. 07/082,977 filed Aug. 4, 1987, now abandoned, which is a continuation of application Ser. No. 07/014,140 filed Feb. 12, 1987, now abandoned, which is a continuation of application Ser. No. 06/645,161 filed Aug. 28, 1984, now abandoned.

BACKGROUND OF THE INVENTION

1. Field of the Invention

The present invention relates to a digital image processing system

2. Description of the Prior Art

An image processing system such as a digital copier or a facsimile system has been recently proposed. Such an apparatus has an accumulating transducer element such as a solid-state image pick-up device, e.g., a CCD for reading an image and converting an analog signal into a digital signal. The obtained digital signal is processed and is transmitted through a digital transmission line or is used to reproduce an image by a laser beam printer or the like.

In order to transmit and accumulate image signals, a digital image processing apparatus of this type requires a special processor, transmitter and storage.

This requires image processing equipment in addition to other image processing equipment for word processing or computer processing. Such an increase in the amount of hardware results in a reduced space in the office using equipment of this type, difficult handling, and an increase in the cost.

A method is conventionally known for compressing and expanding digital image data so as to reduce the amount of data transmitted.

However, in a digital recording apparatus, due to the requirements of high-speed and a high-quality image together with an increase in the amount of data to be handled, high speed image signal processing must be performed. However, it is technically difficult to compress, expand and transmit read digital image signals in real time.

Furthermore, depending upon a particular pattern arrangement, the amount of image data may be increased upon data compression. For example, in the Modified Huffman one-dimentional run length coding method, 2-bit data of 1 black bit and 1 white bit is converted into 9-bit data upon coding. This increase in the amount of data may exceed the transfer capacity of a transmission line or occupying time of the line.

When the pel density or image processing speed is different between an image reader and an image recorder, connection of the image reader with the image recorder for exchange of the digital image data is either very difficult or impossible.

SUMMARY OF THE INVENTION

It is an object of the present invention to provide an image processing system which is free from the problems as described above.

It is another object of the present invention to provide an information processing apparatus which can perform both image processing and other information processing.

It is still another object of the present invention to provide an information processing system which can perform image processing and information processing which is not associated with the image processing, with the use of a computer system.

It is still another object of the present invention to provide an image processing system which minimizes the occupying time of a bus with image data in a computer bus system.

It is still another object of the present invention to provide an image processing system which transfers read image data to a computer bus to store or transmit the data as compressed image data which is used for printing.

It is still another object of the present invention to provide an image processing system which compresses read image data and fetches the data on a computer bus.

It is still another object of the present invention to provide an image processing system which can decode image data received through a computer bus and print out in accordance with the received image.

It is still another object of the present invention to provide an image processing system which can perform image reading and data transfer onto a computer bus in real time.

It is still another object of the present invention to provide an image processing system which can transfer image data, from a computer bus and print an image in real time.

It is still another object of the present invention to provide an image processing system which has a computer bus which transmits image data with priority.

It is still another object of the present invention to provide an image processing system which can be suitably adapted when the reading or printing speed of an image is not significantly higher than the data transfer speed of a computer bus.

It is still another object of the present invention to provide an image processing system which allows coding or decoding of high-speed, high-density digital image signals without requiring a large-capacity memory.

It is still another object of the present invention to provide an image processing system which can transmit or process without an increase in the amount of data image signals such as digital signals which have been processed by the dither method for reproducing a halftone image which ordinarily results in a poor coding performance.

It is still another object of the present invention to provide an image processing system which can transmit image data between an image reader and an image recorder which have different pel densities, data amounts and/or image signal rates.

It is still another object of the present invention to provide an image processing system which allows selection between compression or non-compression modes.

It is still another object of the present invention to provide an image reader which can be connected to a computer bus system.

It is still another object of the present invention to provide an image printer or an image transmitter which can be connected to a computer bus system.

The above and other objects, features and advantages of the present invention will become apparent from the following description taken in conjunction with the accompanying drawings.

BRIEF DESCRIPTION OF THE DRAWINGS

FIGS. 7-1 to 7-3 are flow charts for explaining the data transmission in the system according to the present invention; and FIGS. 8-1 and 8-2 are representations for explaining the use states of the bus in the system according to the present invention.

DETAILED DESCRIPTION OF THE PREFERRED EMBODIMENT

The preferred embodiment of the present invention will be described below.

Figure 1:
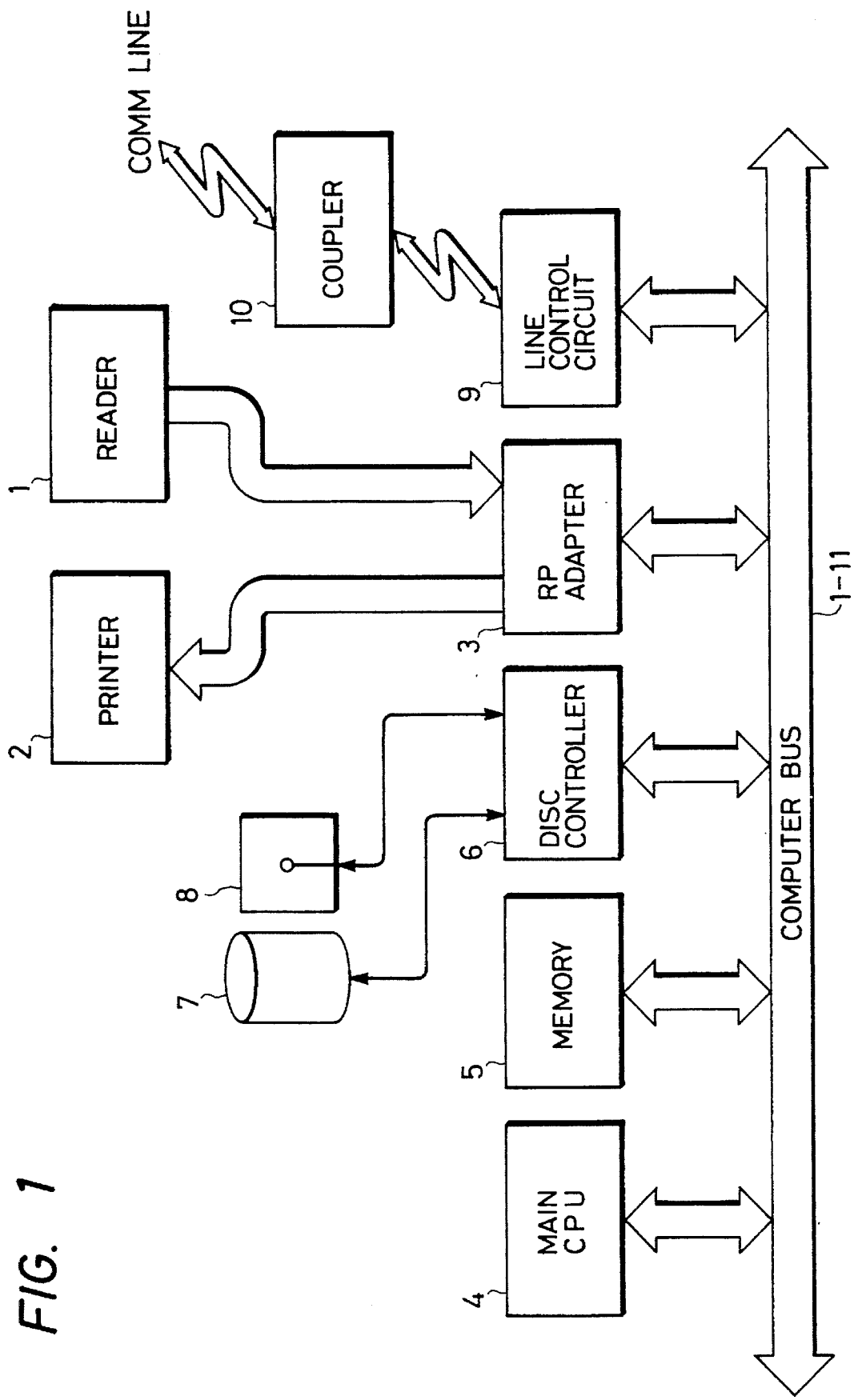
FIG. 1 is a system block diagram showing an image processing system according to the present invention.

FIG. 1 is a system block diagram to which an image processing system according to the present invention can be applied.

A reader 1 reads an original with a CCD image sensor, performs an A/D conversion, a shading correction, and a digitizing processing and the like, and produces a digital image signal to an external circuit.

A printer 2 forms on a printing paper sheet a digital image and is, for example, a laser beam printer (LBP). The reader 1 and the printer 2 can be directly coupled to each other to constitute a copier. According to the embodiment of the present invention, the reader 1 and the printer 2 are connected through an interface to additionally provide a facsimile function without requiring much modification in the reader 1 or the printer 2.

An RP adapter 3 is a converter which converts the digital image signal exchanged between the reader 1 and the printer 2 into a signal which can be easily handled by a computer bus 1-11. The computer bus 1-11 can be a MULTIBUS available from Intel Corporation and has a maximum transmission rate of several Mwords/sec. A main CPU 4, a memory 5, a disc controller 6, a line control circuit 9, and the RP adapter 3 in the forms of boards are connected to each other through the computer bus 11.

Original image data read by the reader 1 is converted by the RP adapter 3 and is stored in the memory 5. The data is, if required, stored in a magnetic disc 7 or floppy disc 8 through the disc controller 6. The stored data is sent onto the communication line through the line control circuit 9 (modem or the like) and a coupler 10.

The original data received through the communication line is stored in the memory 5 through the coupler 10 and the line control circuit 9 and is then stored, if required, in the magnetic disc 7 or the floppy disc 8 through the disc controller 6. The stored data is sent to the printer 2 through the RP adapter 3 to print an image on a printing paper sheet.

A series of facsimile operations as described above is controlled by the main CPU 4 in a concentrated manner.

Figure 2:
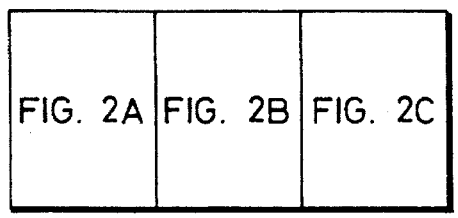
FIG. 2 composed of FIGS. 2A, 2B and 2C is a detailed circuit diagram of the RP adapter in the system according to the present invention.
Figure 2A:
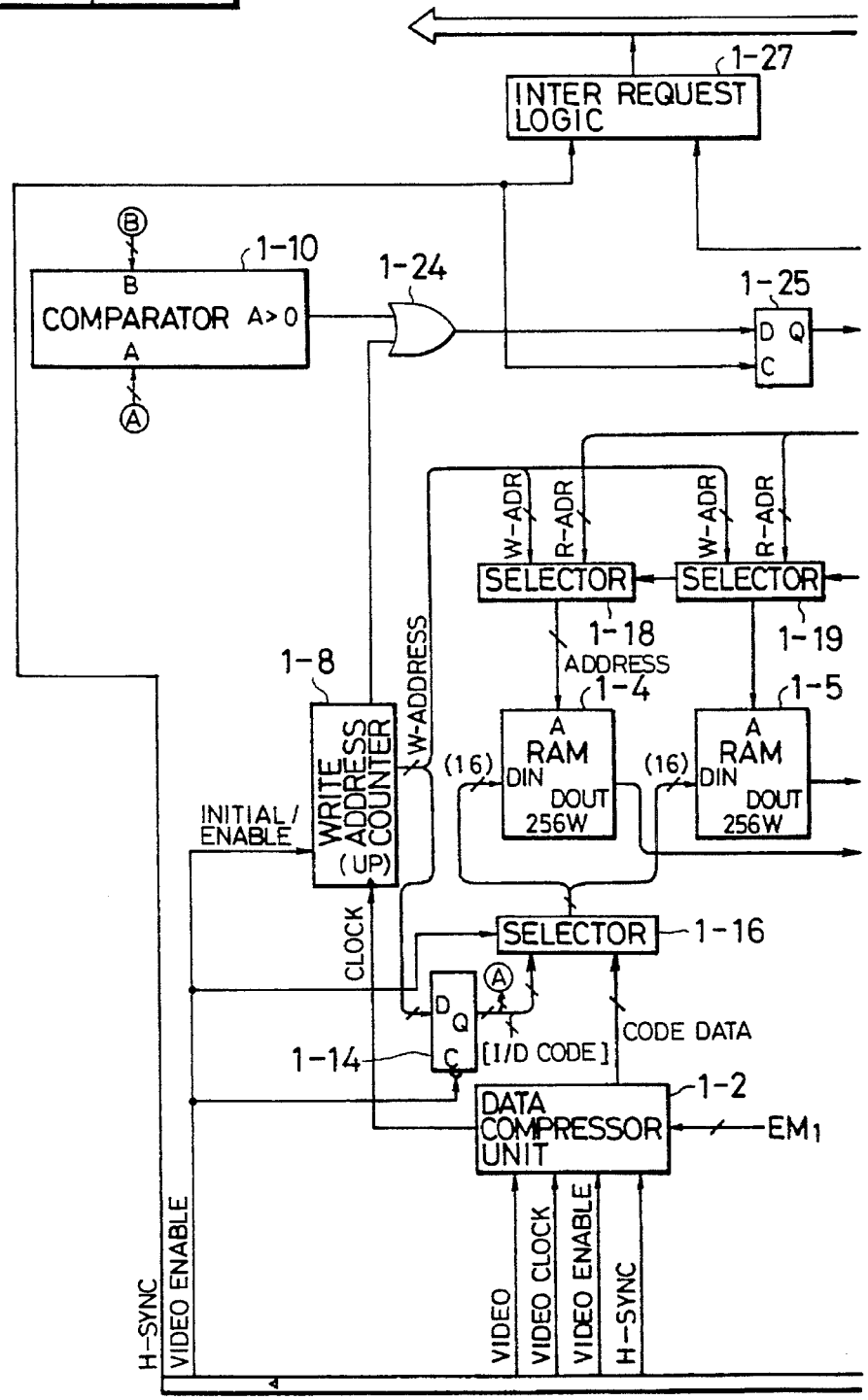
Figure 2B:
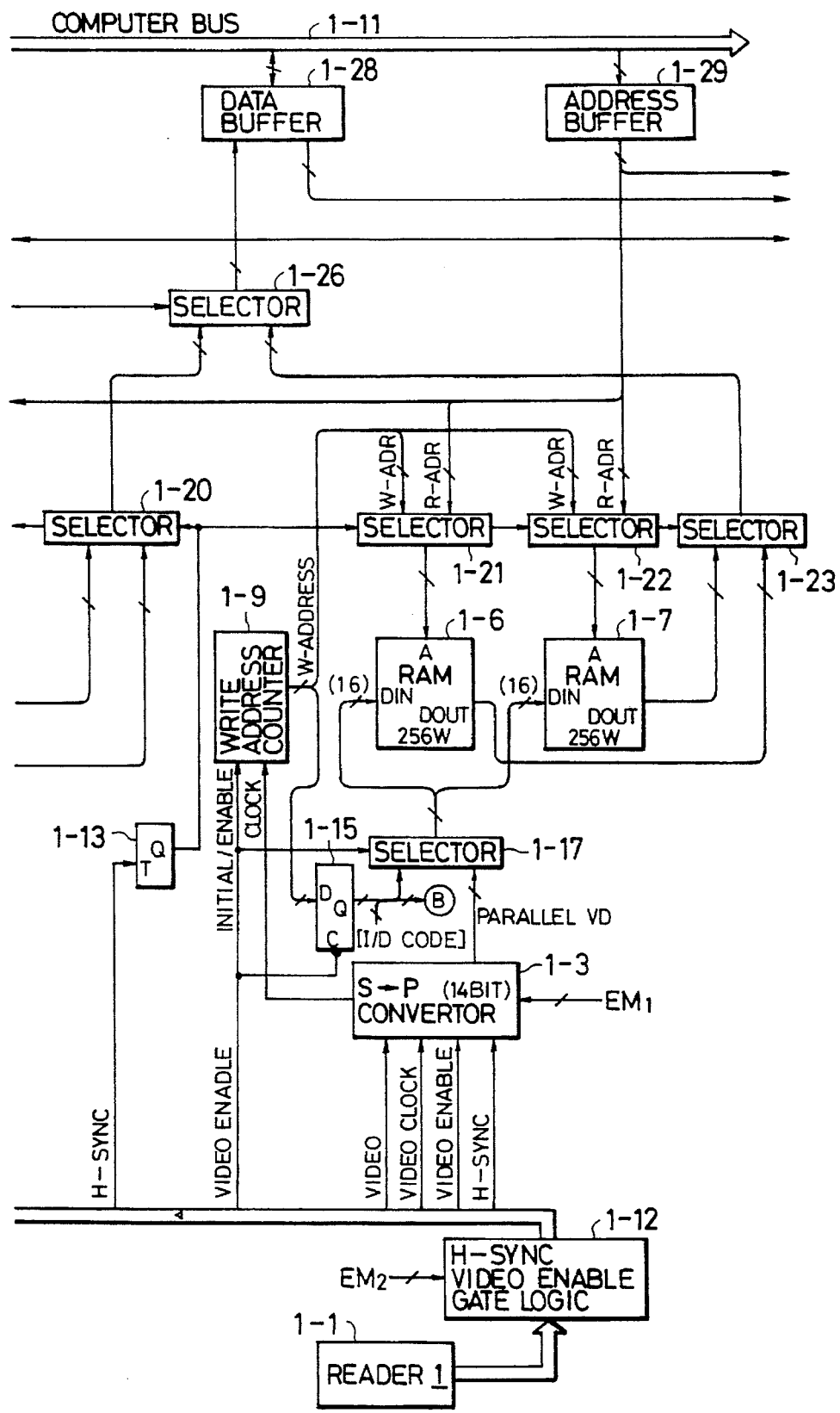
Figure 2C:
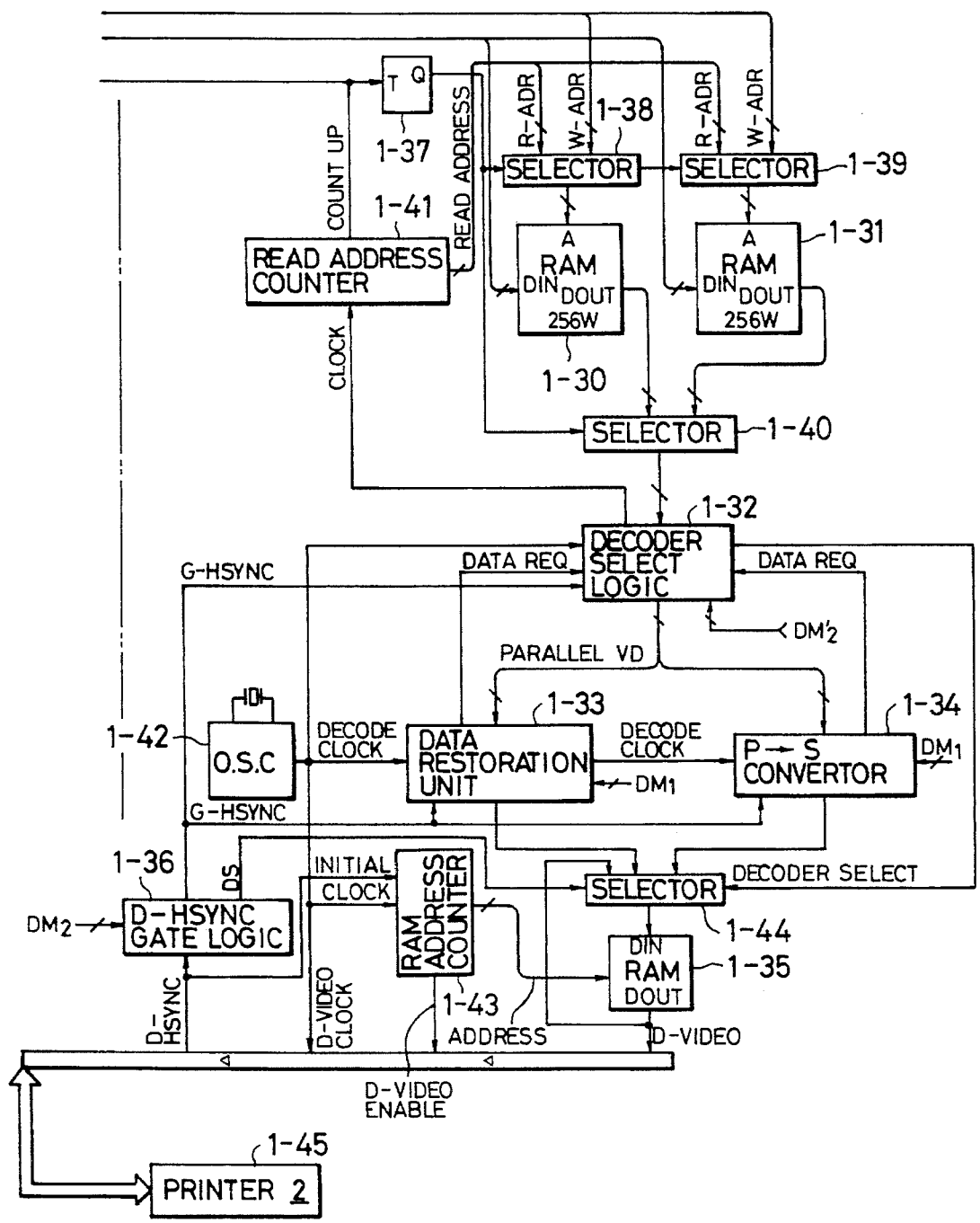

FIG. 2 is a circuit diagram of the RP adapter 3 of the system shown in FIG. 1. A reader 1—1 transmits serial digital image data for each read line together with a sync signal. The reader 1—1 performs a main scan with a 1-line CCD and a sub scan by moving either one of the CCD and an imaging system at a predetermined speed relative to the other. The reading operation is performed at a resolution of 400 bpi (bit/inch) in both of the main and sub scan directions.

A data compressor unit or data compression unit 1-2 compresses image data Video of the bit format from the reader 1—1 by a coding or the like. In this embodiment, a known run length coding circuit is used. A serial-to-parallel converter (to be referred to as an S→P converter hereinafter) 1-3 converts the bit serial image data Video into parallel data. Double buffer memories (RAMs) 1-4 and 1-5 and 1-6 and 1-7 have capacities to store one-line image data obtained through the data compressor unit 1-2 and the S→P converter 1-3. The buffer memories are operated such that while the image data is written in the memory 1-4 (1-6), the image data is read out from the memory 1-5 (1-7). Write address counters 1-8 and 1-9 count data write addresses for the respective double buffer memories. A comparator 1-10 compares the magnitudes of the data from the image compressor unit 1-2 with the conversion data from the S→P converter 1-3. An output from the comparator 1-10 controls selector 1-26 so as to supply the converted image data from a conversion logic having a smaller data amount to a MULTIBUS (computer bus) 1-11. The converted image data is supplied to the memories and the like shown in FIG. 1 through the computer bus at a predetermined computer system speed.

The decoding or restoration section of the compressed image data has the following configuration. Double buffers 1-30 and 1-31 are for synchronizing the data transfer from the computer bus 1-11 as a compressed data source and readout of the compressed data by a restoration logic. A data request is generated onto the computer bus 1-11 in synchronism with a read address counter 1-41. A decoder select logic 1-32 discriminates the properties of the compressed data read out from the double buffer and selects a restoration logic to be used. A data restoration unit 1-33 corresponds to the data compressor unit 1-2. A parallel-to-serial converter (to be referred to as a P→S converter) 1-34 corresponds to the S→P converter 1-3.

In accordance with the restoration unit described above, a RAM 1-35 allows readout of the bit serial image signal and conversion of pel density in the sub scan direction. An output from the RAM 1-35 is reproduced by a printer 1-45.

In this embodiment, compression of the image data is performed in synchronism with a sync signal HSYNC corresponding to a 1-line read signal from the reader 1—1. Restoration of the image is performed in synchronism with a sync signal D-HSYNC (corresponding to a 1-line beam scan end in an LB printer) from the printer 1-45. When the sync signal supplied to the compressor or restoration unit is gated and is supplied thereto, pel density conversion, image enlargement and reduction can be performed. The sync signal gate means for this purpose is an HSYNC video enable gate logic 1-12 or a D-HSYNC gate logic 1-36.

The mode of operation of the system of this embodiment will be described below.

Compression Circuit

Figure 3:
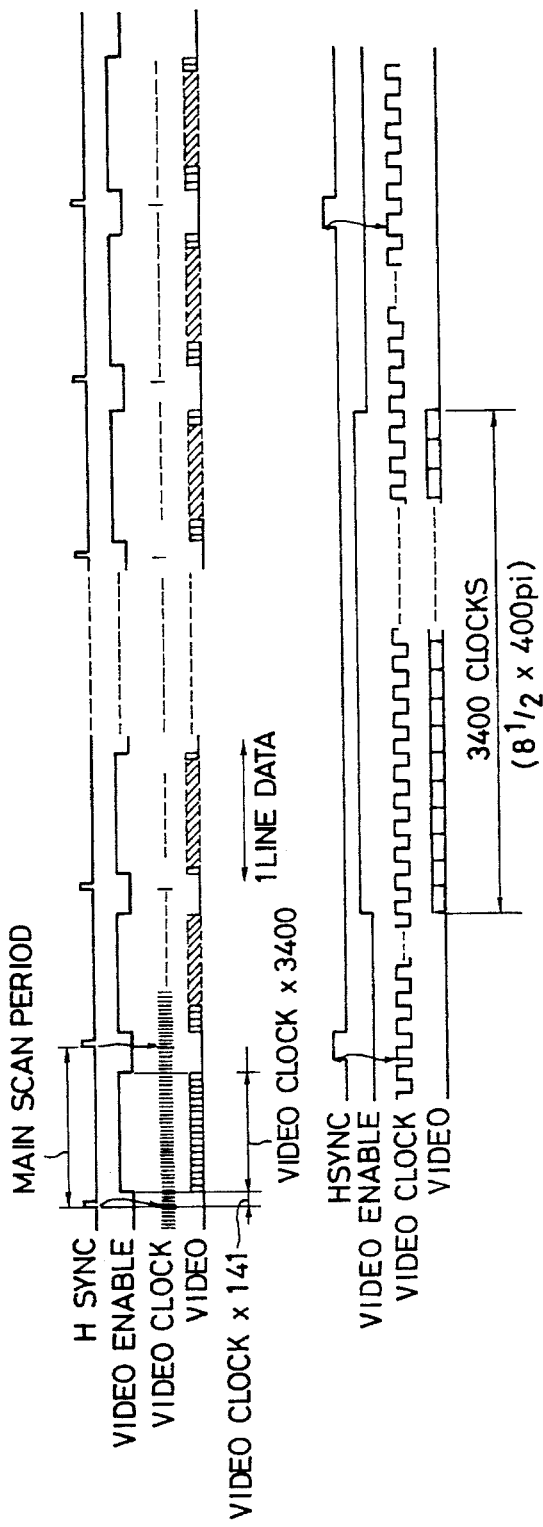
FIGS. 3, 4 and 6 are timing charts for explaining the operation in the system of the present invention.
Figure 6:
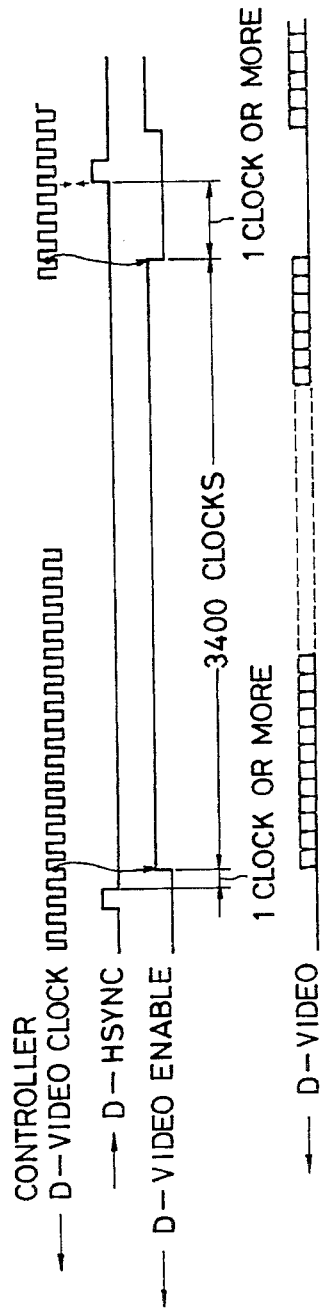

The circuit portion at the left side of the alternate two long and one short dashed line in FIG. 2 is a compression circuit. A digital image signal from the reader 1—1 is processed and transferred to the computer bus 1-11. FIG. 3 shows an output signal from the reader 1—1 and a signal format thereof.

The signal from the reader 1—1 consists of a signal HSYNC as an internal :signal for each line, an image data transfer clock Video Clock, a serial image signal Video, and a signal Video Enable which indicates that the image signal is effective in a 1-line interval between the current and next signals HSYNC.

The signal HSYNC corresponding to one clock time is generated in synchronism with the signal Video Clock. The reader used in this embodiment has a maximum main scan length of 8(½) inches and a resolution of 400 bps. Therefore, 3,400-bit image data is transmitted as 1-line image data. Therefore, the invertal (image effective interval) of high level of the signal Video Enable corresponds to 3,400 clocks Video Clock.

These signals are supplied to the data compressor unit 1-2 and the S→P converter 1-3 which independently prepare parallel data. The coded data from the data compressor unit 1-2 is written in the double buffer memories 1-4 and 1-5, while the parallel data from the S→P converter 1-3 is written in the double buffer memories 1-6 and 1-7. The write address counters 1-8 and 1-9 control the write operation in the double buffer memories 1-4 to 1-7. Each counter is initialized by the signal Video Enable. The counter 1-8 is operated by the clocks synchronized with the image coding by the data compressor unit 102. The counter 1-9 is operated by the clocks synchronized with the conversion operation of the S→P converter 1-3. The switching operation of the double buffers is performed by the address selectors or data selectors 1-18, 1-19, 1-20, 1-21, 1-22 and 1-23 when a toggle flip-flop 1-13 changes its state for each line. The read address data is supplied from the computer bus through an address buffer 1-29. Each buffer is thus read in synchronism with data on the computer bus and the readout data is transmitted.

Figure 4:
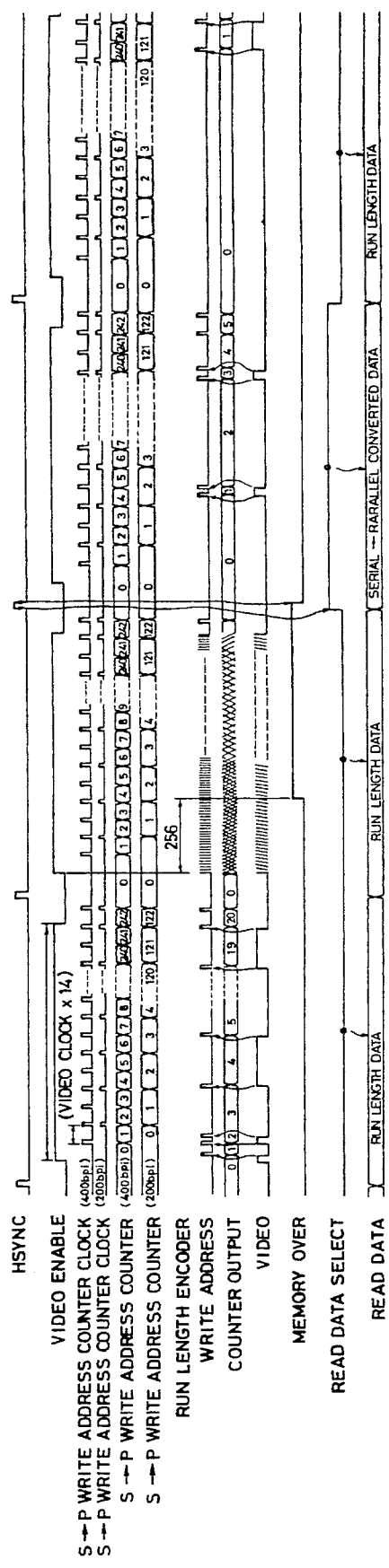

The circuit operation of the compressor unit described above is illustrated in the timing chart shown in FIG. 4. The S→P converter 1-3 converts an image signal into a 14-bit parallel signal. Therefore, the S→P converter 1-3 supplies one clock signal to the write address counter 1-9 upon receiving 14 clocks Video Clock. In this case, the address counter counts from 0 to 42 in accordance with 3,400 clocks Video Clock per line. The 3,400 clocks Video Clock correspond to a memory capacity of 256 words. When the resolution is reduced to half, and a serial-to-parallel conversion at a rate of 200 bpi is performed, the count of the address counter is changed upon reception of 28 clocks and is incremented to 122 upon reception of 3,400 clocks Video Clock. In this manner, the S→P conversion address counter 1-9 performs a normal counting operation within one main scan periodic. However, the write address counter 1-8 for run length compression data operates in a different manner. The image compressor unit 1-2 encodes the number of clocks Video Clock which were held in one state and supplies a corresponding signal. Therefore, the clock input to the write address counter 1-8 changes every time the state of the clock Video Clock changes. Therefore, when a 3,400-bit image signal of one line is received, 3,400 clocks are received in the address counter 1-8. In other words, while the output from the address counter 1-9 is kept at a predetermined value, the output from the counter 1-8 changes from 1 to 3,400. Which one of the conversion data from the unit 1-2 and the converter 1-3 is smaller than the other is determined by comparing the counts of these address counters. The conversion data amount is determined by the trailing edge of the Video Enable. Therefore, the counts from the address counters are latched in flip-flop 1-14 and 1-15. The values from the respective flip-flops 1-14 and 1-15 are compared by the comparator 1-10, an output from which is latched in a flip-flop 1-25 in response to a line sync signal HSYNC. Depending upon the output state of the flip-flop 1-25, the selection of the data to be read onto the computer bus 1-11 is performed by a selector 1-26. When the number of clocks received by the address counter 1-8 counting the run length exceeds the capacity (256 words) on the memory, the selector 1-26 is set to select data from the S→P converter 1-3 in accordance with the other input signal to an OR gate 1-24.

The data written in the buffer RAMs 1-4 to 1-7 will be described with reference to FIG. 5. One-line data from the unit 1-2 and the converter 1-3 are sequentially written at addresses 2, 3 and so on in 16-bit parallel data starting from address 1 of the RAMs 1-4 to 1-7. The data has the following format.

Figure 5A:
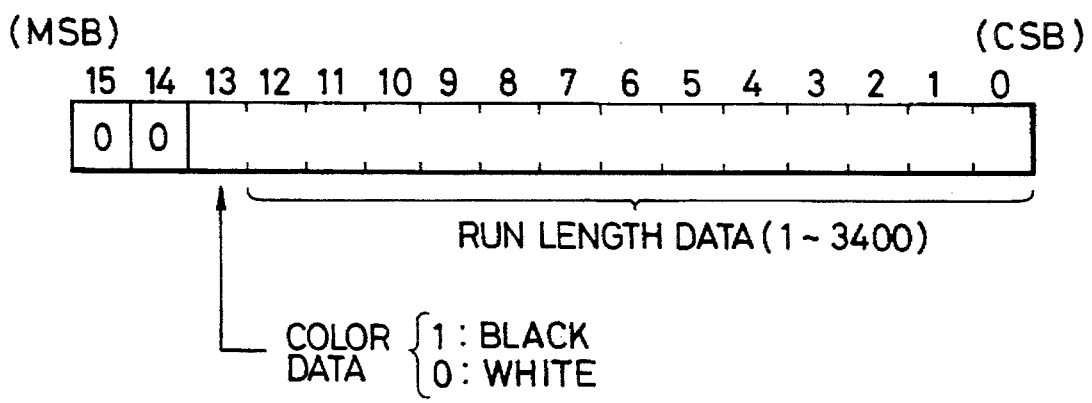
FIGS. 5a, 5b and 5c are diagrams showing the transmission data.
Figure 5B:
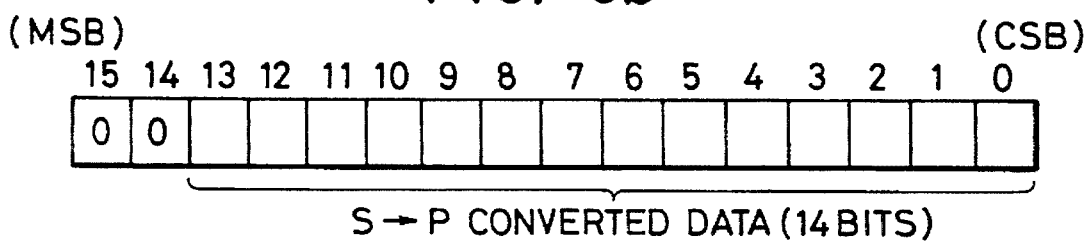

In the case of the run length coded data from the compressor unit 1-2, the data is written as shown in FIG. 5a. The data from the S→P converter 1-3 is written in the RAMs 1-6 and 1-7, as shown in FIG. 5b. In this case, "00" at the 14th and 15th bits indicate that bits 0 to 13 are image data.

Figure 5C:
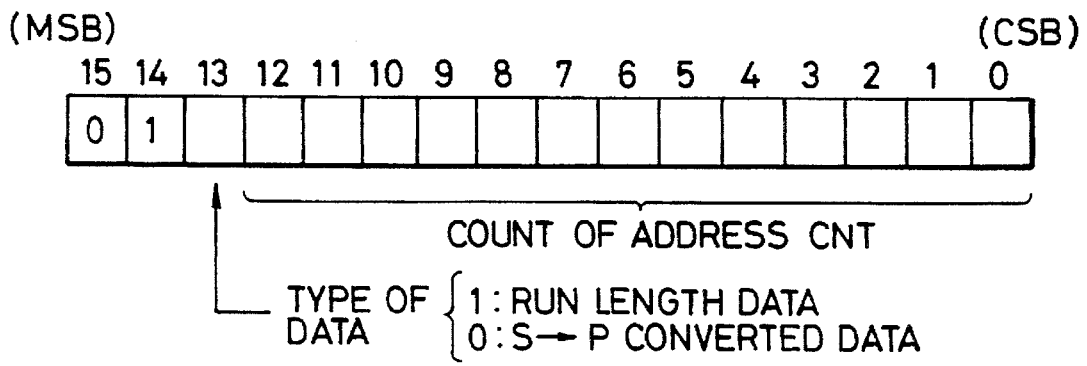

When writing of one line of data is completed, an identification code for a start of one line is added to the counts of the addresses latched in the flip-flops 1-14 and 1-15, and the results are written at address 0 of the RAMs. The format for this data is as shown in FIG. 5c. More specifically, "1" is written at the 13th bit of the data written at address 0 of the RAMs 14 and 15, and "0" is written at the 13th bit of the RAMs 1-6 and 1-7. The 15th and 14th bits are identification code which identifies if the data is data at the boundary between lines or actual image data.

In this manner, the unit 1-2 and the converter 1-3 independently write the conversion data in the RAMs in response to the sync signal generated for each line. However, only one piece of this data is read out, and selection between this data is determined in accordance with the counts of the address counters 1-8 and 1-9 during the write operation.

In response to an interrupt signal generated by the signal HSYNC, the computer bus 1-11 starts reading the conversion data (one-line of previous data) of one line of data written in the RAMs. The read rate must be fast enough to allow read out of the effective data in the RAMs within one interval of the signal HSYNC. The computer bus 1-11 sends a data read request signal from an interrupt request logic 1-27 to the main CPU 4 or the disc controller 6 which discriminates the received signal and produces the read address data. Thus data read from address 0 of the RAMs is started. At the address 0, the type of data of one line at the addresses following address 0 is written. Thus,the data corresponding to this length is read, and the read data is supplied to the memory devices 5 to 8 or the line control circuit 9. In this case, the data length is discriminated by the CPU or the disc controller 6 to control the output of the read address data. Then, unnecessary data need not be read from the RAMs, and the occupying time of the computer bus by the image data can be minimized.

Thus, an empty time can be obtained for each one line during transmission of compressed data, and the computer bus can be released for such a time. Thus, the computer bus can be utilized for such an empty time for communication of the data of the disc controller 6 by the line control circuit 9.

This will be described in more detail below.

FIG. 7 is a flow chart showing data processing by the main CPU 4 shown in FIG. 1. FIG. 7-1 shows a main routine for storing the computer data or word-processing data from the communication line to the disc through the computer bus. The main CPU 4 has a DMA controller. When the DMA controller is connected, data received from the communication line is stored in the discs 7 and 8 or the memory 5 without going through the CPU 4 or the data is sent from the discs 7 and 8 and the memory 5 to the communication line without going through the CPU.

In the flow chart shown in FIG. 7-1, in step S-1, it is discriminated if the data received from the communication line is stored to the full capacity in the buffer in the line control circuit 9. When it is determined in step S-1 that the buffer is full, the DMA controller is operated to transfer the line data in the buffer to the disc controller 6 through the bus 1-11. The line data is thus written in the discs 7 and 8, in step S-2. Thereafter, steps S-1 and S-2 are repeated to sequentially store the data received through the line in the discs. Furthermore, since the buffer is used, no problem occurs even if the data transfer rate on the bus is different from the data transfer rate on the communication line. When data is transferred from the disc to the communication line through the bus, it can be easily achieved with the buffer of the disc controller 6 and the DMA transfer, as shown in FIG. 7-1. Note that word data from a wordprocessor or the like (not shown) connected to the bus 1-11 can be stored in the discs and memory.

In this manner, the computer bus 1-11 can transfer image data between the reader 1 and the printer 2 while it transfers other information not related to the image data or word processing data to the discs or to the line modulator.

FIG. 7-2 shows an interrupt routine for fetching the image data from the reader 1 onto the bus 1-11. That is, in this routine, the bus is occupied for this purpose and is then released.

When the interrupt request logic 1-27 shown in FIG. 2 generates an interrupt request signal, the CPU 4 controls the DMA controller and interrupts data transfer as shown in FIG. 7-1 between the communication line and the discs through the bus 1-11 (step S-3). Next, the CPU 4 supplies the read address data for reading out data from the RAMs 1-4 to 1-7 shown in FIG. 2 to the buffer 1-29 so as to read out data at address 0 of the RAMs and recognize the amount of the 1 line image data stored in the RAMs (step S-4). The recognized amount of the 1 line image data is set in the DMA controller, and the data transfer from the RAMs of the RP adapter 3 by DMA is started (step S-5). It is then discriminated (step S-6) in accordance with the data amount set in the DMA controller if the ,data transfer of the 1 line image data has been completed. Therefore, data transfer between the communication line and the discs is resumed in step S-7, as, shown in FIG. 7-1.

FIG. 8 shows the state of use of the computer bus. FIG. 8-1 shows the state of bus in the flow shown in FIG. 7-2. "A" represents the bus occupy period by data transfer between the communication line and the disc, and "B" represents the bus occupy period by the data transfer between the RP adapter 3 and the memory 5.

Note that the memory 5 can store data of several pages of normal documents. Therefore, the main CPU 4 can perform editing such as partial cancellation or synthesis of the data of the memory 5.

It is also possible to release the bus for data transfer of the RP adapter only after a predetermined data transfer between the communication line and the disc is completed. This may be achieved by giving a low priority to the interrupt request logic 1-27 so that no interrupt is allowed during the "A" bus occupy period. In this case,the reader 1 displays that the bus is in the period "A" and the read input is inhibited, so that the operator may not perform a further read scan of the document. When the RAMs shown in FIG. 2 are page memories capable of storing all the information on the document, further input of the document information can also be allowed in the period "A", a scan operation of the document by the reader 1 is allowed, and the 1 page data is stored in the RAMs. However, readout of the data from the RAMs onto the bus is inhibited. In the period "A" or "B", the transfer will not be interrupted. Therefore, data which requires continuous transmission can be transmitted with convenience.

The configuration of the RP adapter shown in FIG. 2 is suitable when the image read speed of the reader 1 is substantially the same as the data transfer speed of the bus but is slightly slower than it. When the read speed of the reader is very fast, RAMs having a capacity to store one page data must be used as RAMs 1-1 to 1-7.

Pel Density Conversion I

Conversion of pel density of compressed data will be described below. Reduction of image data can be performed, and a recording apparatus having a small recording pel density can be used for an image reader.

When an original image to be read is a character image or the like, a high resolution of 400 bpi is not required. In such a case, if the resolution is lowered, the transfer time is shortened, the time that the computer bus is occupied can be reduced, and the use efficiency of the intermediate buffer memory discs and memories is improved, resulting in an economical advantage. When the image reduction function is not included in an image recorder, the data must be compressed and then be transmitted by the transmitter. If the recorder has an enlarging function and the transmitter reduces the data and sends it, the amount of data transmitted can be reduced.

The resolution in the main scan direction can be decreased by a conventional method. According to this method, the frequency of image sampling clocks is changed. More specifically, the frequency of the clock Video Clock corresponding to serial data Video before conversion at the unit 1-2 and the converter 1-3 is controlled. The clock rate is set as EM1 in this case.

An H-SYNC video enable gate logic 1-12 is used to reduce the image in the main scan direction (to lower the resolution). The image data compression circuit described above is controlled by signals HSYNC and Video Enable. Therefore, when these signals corresponding to data of predetermined lines corresponding to a desired rate are gated and not supplied, the data of these lines is not processed, thereby sampling the data. Since a data read request, Data Req, corresponding to these lines is not supplied to the bus 1-11, the data of the gated lines will not be read nor sent onto the bus.

In order to obtain data of a desired resolution, the gate logic 1-12 has the following configuration. The gate comprises a clock sampling means such as 7479TTC which receives a signal HSYNC as a 1 line sync signal at a clock terminal and generates a gate signal, thereby sampling the signals HSYNC and Video Enable. The sampling rate for determining the resolution (reduction ratio) is set as EM2 by a setting means such as a switch (not shown). The pel density and reduction ratio in the vertical and horizontal directions can be arbitrarily set by independently setting EM1 and EM2.

Restoration or Expanding Circut

The method of restoring the compressed data into original data (expanding) will be described below. The restoring unit restores the data supplied through the computer bus 1-11. The compressed data is supplied from the compression circuit described above but need not be that from the compressor unit 1-2 connected to the same computer bus to which the restoration unit is connected. The data stored in the memory 5 can be data from the coupler 10.

First, the computer bus 1-11 writes data of a predetermined amount in one of RAMs 1-30 and 1-31. In this embodiment, the RAM has a capacity of 256 words. The RAMs 1-30 and 1-31 comprise double buffers. Thus, the RAMs operate such that when data is being written in one RAM, the data is read out from the other. The decoder select logic 1-32 supplies a clock to the read address counter 1-41 so as to find an interval signal for each line from data stored in the RAMs. When the interval signal of one line is found, since the data format (FIG. 5) of the subsequent data is written therein, a signal is supplied to a selector 1-44 so as to select a corresponding decoder. Data restoration is started in synchronism with a sync signal G-HSYNC (to be described later) from a printer 1-45. The data restoration circuit has, in correspondence with the data compressor unit 1-2 and the S→P converter 1-3, a data restoration unit 1-33 and a parallel-to-serial converter (to be referred to as a P→S converter) 1-34 for converting the parallel data into serial data. The unit 1-33 and the converter 1-34 are normally operated in response to the sync signal G-HSYNC. Each of the unit and the converter generates a data request signal, Data Req, requesting the next data in response to the restoration operation. The decoder select logic 1-32 sends the request signal from the restration circuit designated by the line inteval signal as a clock for the read address counter 1-41. In this manner, a line serial video signal is supplied to the printer 1-45. This is shown in FIG. 4. A clock D-Video Clock from a clock generating means 1-42 is generated in response to a sync signal D-HSYNC from the printer 1-45, and a serial image signal, a D-Video and a D-Video Enable are produced in response thereto.

The decoder select logic 1-32 sends a data request signal from the restoration unit to the read address counter 1-41 to fetch the next data. However, if the received data is a line interval signal, the data is not supplied to the restoration unit and the next line sync signal D-HSYNC is awaited. Then, the data selector 1-40 is set in a predetermined state and the next data is supplied to the restoration unit.

When data read out from one of the double buffers is completed (empty), the counter 1-41 supplies a count up signal to a toggle flip-flop 1-37 so as to switch the read and write operations of the two RAMs. At the same time, in order to transfer 256 word data, the counter 1-41 supplies a count up signal for 256 addresses to the interrupt request logic 1-27.

Since a maximum data amount per line is about 256 words, the period of the interrupt signal supplied to the computer bus 1-11 becomes longer than the interval of the one-line sync signal D-HSYNC from the printer 1-45. Therefore, a computer bus system having a minimum transfer speed of 256 words per line period must be used. Therefore, the faster the bus speed, the longer the empty time per line after transfer of the 256-word data. Therefore, other information processing and transmission can be performed during such empty time.

This will be described with reference to FIGS. 7 and 8. FIG. 7-3 is a flow chart of an interrupt routine for transferring image data to the printer 2.

When the interrupt request logic 1-27 produces an interrupt request signal, the CPU 4 interrupts the data transfer as shown in FIG. 7-1 between the communication line and the disc Via the control bus 1-11 by controlling the DMA controller (step S-8). Then, 256-word data to be stored in the RAMs 1-30 and 1-31 is set in the DMA controller. The write address data for writing the image data in the RAMs 1-30 and 1-31 next is supplied to the address buffer 1-29, shown in FIG. 2. Then, data transfer from the memory 5 to the RAMs of the RP adapter 3 by DMA is initiated (step S-9). Completion of 256-word data transfer is determined from the amount of data set in the DMA controller and the transfer of data from the memory 5 to the RAMs is then stopped (step S-10). Data transfer between the communication line and the disc is then resumed (step S-11).

FIG. 8-2 shows the use state of the bus in the flow chart shown in FIG. 7-3. A period A corresponds to data transfer between the communication line and the disc, and a period C corresponds to transfer of printing data from the memory 5 to the RP adapter 3.

When the data transfer between the communication line and the disc is completed, the interrupt request logic 1-27 is enabled and the bus can be released for transferring the printing data. In this case, the busy period "A" is displayed at the printer display section of the main CPU 4 to inhibit an input of a printing instruction. When the bus is thus in the period A or C, the data transfer is not interrupted, resulting in convenient communication and printing.

It is also possible to produce data stored in the RAM 1-35 to a display such as a CRT so as to display an image in accordance with data stored in the memory 5.

The above operation can be conveniently performed when the data transfer rate of the bus is equivalent to or is slower than the printing speed of the printer 2. When the printing speed of the printer 2 is significantly faster than the transfer rate of the bus, the RAMs 1-30 and 1-31 must have a capacity to store 1-page data.

Pel Density Conversion II

The pel density converting means in the restoration unit operates in the following manner.

Conversion of the pel density in the main scan direction is performed by sampling basic clocks from the clock generating means 1-42 so as to sample the image data. In this case, sampling the output and serial data from the data restoration unit 1-33 and the P→S converter 1-34. Then density conversion data is set as DM1 by a preset switch or the like. Conversion of the pel density in the sub scan direction is performed by the following means. When an image is produced in one-to-one magnification with a printer having a resolution higher than the transferred data or is produced with a printer of the same resolution of the transferred data, the same restored line data is produced a plurality of times. For this purpose, a line memory is used as the RAM 1-35 after the data selector 1-44. The RAM 1-35 is operated in response to an output from a RAM address counter 1-43 which operates in synchronism with a sync signal D-HSYNC (beam detection signal BD) from the printer. After the output from the selector 1-44 is stored once in this RAM, it can be read out therefrom. When the data of the same line is to be produced a plurality of times, a select signal DS is kept supplied to the selector 1-44 by the D-HSYNC gate logic 1-36 so that the output signal from the RAM 1-35 becomes the data input signal to the selector 1-44. When the same data is produced, the data from the data restoration unit 1-33 is not used. Therefore, the D-HSYNC gate circuit 1-36 is gated such that the sync signal G-HSYNC to be supplied to the data restoration unit 1-33 otherwise is stopped. The select signal DS to be supplied to the selector 1-44 is produced in synchronism with the gate operation. The gate period is proportional to an enlargement conversion data DM2 which is preset. DM2 can be preset independently of DM1 so as to change the enlargement ratio of the length to the width of the original. The D-HSYNC gate logic 1-36 for obtaining a desired resolutin (enlarging magnification) has the same configuration as that of the H-SYNC gate logic 1-36. Since a signal G-HSYNC is not supplied to the decoder select logic 1-32 during this gate period, the clock input to the read address counter 1-41 is stopped. Therefore, readout from the buffer RAMs is not performed and the apparatus is set in the standby mode while the data is kept stored therein. During this time, the computer bus 1-11 is released and utilized for other devices as shown in FIG. 1. When the gate period elapses, the decoder select logic 1-32 starts readout and decoding of the data of the next line in response to the subsequent signal G-HSYNC. The unit 1-33 or the converter 1-34 produces a signal Data Req at every decoding end of one word, and a clock is supplied to the read address counter 1-41 to read data from the RAMs. When the decoder select logic 32 determines that the data from the RAMs indicates an end of one-line data, supply of the next one-line data to the data restoration unit 1-33 or the P→S converter 1-34 is prohibited, and the apparatus is set in the standby mode by the signal G-HSYNC. When data readout is performed until the RAM 1-30 is empty, data readout from the RAM 1-31 is then performed and storage of the data from the bus into the RAM 1-30 is started. This is performed in accordance with the write address data received from the bus.

When an image of one-to-one magnification is to be reproduced with a printer having a resolution lower than that of the data transferred through the bus 1-11 or with a printer having the same resolution as that of the transferred data, the line must be sampled. This is performed by the decoder select logic 1-32. More specifically, the line interval signal is skipped so as to achieve the resolution represented by the data DM2. When an image reproduction is to be performed with a printer having a resolution half that of the transferred data, when decoding of one line of data is completed (this can be confirmed when the next line interval signal is supplied to the decoder select logic 1-32), the next line is skipped. Clocks are supplied to the read address counter 1-41 until the next line boundary signal is received. Then, the data of 1-line intervals can be supplied to the data restoration unit 1-33.

In the above embodiment, the compressor unit 1-2 and the converter 1-3 are operated in accordance with the image data. However, a selection between the first and second different compression or coding methods (e.g., the MH conversion method and the MR conversion method) may be performed in accordance with the amount of data to be converted.

It is to be noted, in this case, corresponding converters must be included at the restoration circuit. The operation at the data compressor unit 1-2 and the converter 1-3 can be performed manually. In this case, a select input key to instruct this operation may be arranged at the control section of the main CPU.

In the above embodiment, the computer bus is released after the one line processing is completed when data is coded and decoded. However, the bus can be released upon transmission of data of a plurality of lines or transmission of one page of data. Complex exchange of control signals between the main CPU and the like through the bus can be reduced.

In this case, an interrupt request signal is supplied to the computer bus in the released state to prevent the bus use by other equipment having a lower priority so as to transfer data of higher priority. Therefore, substantially continuously with the readout of the original image, image data is transmitted and can be stored in a file apparatus. Therefore, the system processing time can be shortened. The embodiment of the present invention can be applied to storage of all the data of the read image in a memory. The data stored in the memory can be compressed or decoded as needed.

What I claim is:

1. A data processing system in which a plurality of data processing apparatuses conduct data communication through a computer bus line, comprising:

receiving means for receiving image data from a communication line external to said data processing system, storing the received image data in a buffer memory, and supplying the received image data in units of a predetermined amount from the buffer memory to the computer bus line;

reader means for reading an image of a document and supplying document image data in units of a predetermined amount to the computer bus line; and control means for controlling DMA transfer of the received image data and the document image data through the computer bus line on the basis of DMA transfer requests from said receiving means and said reading means, wherein said control means interrupts the DMA transfer of the received image data supplied by said receiving means when said reading means issues the DMA transfer request during the DMA transfer of the received image data, then said control means causes the DMA transfer of the predetermined amount of the document image data from said reading means on the basis of the DMA transfer request from said reading means, and after the DMA transfer of the predetermined amount of the document image data, said control means resumes the DMA transfer of the received image data stored in the buffer memory of said receiving means on the basis of the DMA transfer requests from said receiving means.

2. A system according to claim 1, wherein said reading means comprises compression means for compressing the document image data, and said reading means supplies the compressed image data every time said compression means has compressed a line of image data.

3. A system according to claim 1, wherein said reading means reads the image of the document on a line by line basis.

4. A system according to claim 2, wherein said compression means compresses the document image data by run length coding.

5. A system according to claim 1, wherein the received image data and the document image data are transferred to a memory device through the computer bus line by means of the DMA transfer.

6. A system according to claim 1, wherein said reading means comprises memory means for storing at least one line of the document image data.

7. A data processing method in which a plurality of data processing apparatuses conduct data communication through a computer bus line, comprising:

receiving image data from a communication line external to a data processing system, storing the received image data in a buffer memory, and supplying the received image data in units of a predetermined amount from the buffer memory to the computer bus line with receiving means;

reading an image of a document and supplying document image data in units of a predetermined amount to the computer bus line with reading means; and controlling DMA transfer of the received image data and the document image data through the computer bus line on the basis of DMA transfer requests from the receiving means and the reading means;

interrupting the DMA transfer of the received image data supplied by the receiving means when the reading means issues the DMA transfer request during the DMA transfer of the received image data;

then causing the DMA transfer of the predetermined amount of the document image data from the reading means on the basis of the DMA transfer request from the reading means; and after the DMA transfer of the predetermined amount of the document image data, resuming the DMA transfer of the received image data stored in the buffer memory of the receiving means on the basis of the DMA transfer requests from the receiving means.

8. A method according to claim 7, wherein said reading step comprises the step of compressing the document image data, and supplying the compressed image data every time said compressing step compresses a line of image data.

9. A method according to claim 8, wherein said reading step reads the image of the document on a line by line basis.

10. A method according to claim 8, wherein said compression step compresses the document image data by run length coding.

11. A method according to claim 7, further comprising the step of transferring the received image data and the document image data to a memory device through the computer bus line by means of the DMA transfer.

12. A method according to claim 7, wherein said reading step comprises the step of storing at least one line of the document image data in memory means.

* * * * *

UNITED STATES PATENT AND TRADEMARK OFFICE
CERTIFICATE OF CORRECTION

PATENT NO. : 5,485,535
DATED : January 16, 1996
INVENTOR(S) : SHINOBU ARIMOTO

It is certified that error appears in the above-indentified patent and that said Letters Patent is hereby corrected as shown below:

DRAWING SHEET NO. 3

FIGURE 2B

"VIDEO ENADLE" should read --VIDEO ENABLE--.

COLUMN 1

Line 21, "system" should read --system.--.

COLUMN 2

Line 28, "data," should read --data--.

COLUMN 4

Line 66, ":signal" should read --signal--.

COLUMN 5

Line 48, "periodic." should read --period.--

COLUMN 6

Line 20, "of one" should read --one--.

Line 48, "Thus,the" should read --Thus, the--.

UNITED STATES PATENT AND TRADEMARK OFFICE
CERTIFICATE OF CORRECTION

PATENT NO. : 5,485,535         Page 2 of 2
DATED      : January 16, 1996
INVENTOR(S): SHINOBU ARIMOTO It is certified that error appears in the above-indentified patent and that said Letters Patent is hereby corrected as shown below:

COLUMN 7

Line 45, ",data" should read --data--.

Line 48, "as," should read --as--.

COLUMN 9

Line 30, "restration" should read --restoration--.

Line 31, "inteval" should read --interval--.

COLUMN 11

Line 8, "resolutin" should read --resolution--.

Signed and Sealed this

Ninth Day of July, 1996

Attest:

BRUCE LEHMAN

*Attesting Officer*      *Commissioner of Patents and Trademarks*